April 24, 1945.  R. B. KLING ET AL  2,374,358
ASSEMBLING APPARATUS
Filed May 6, 1943  7 Sheets-Sheet 1
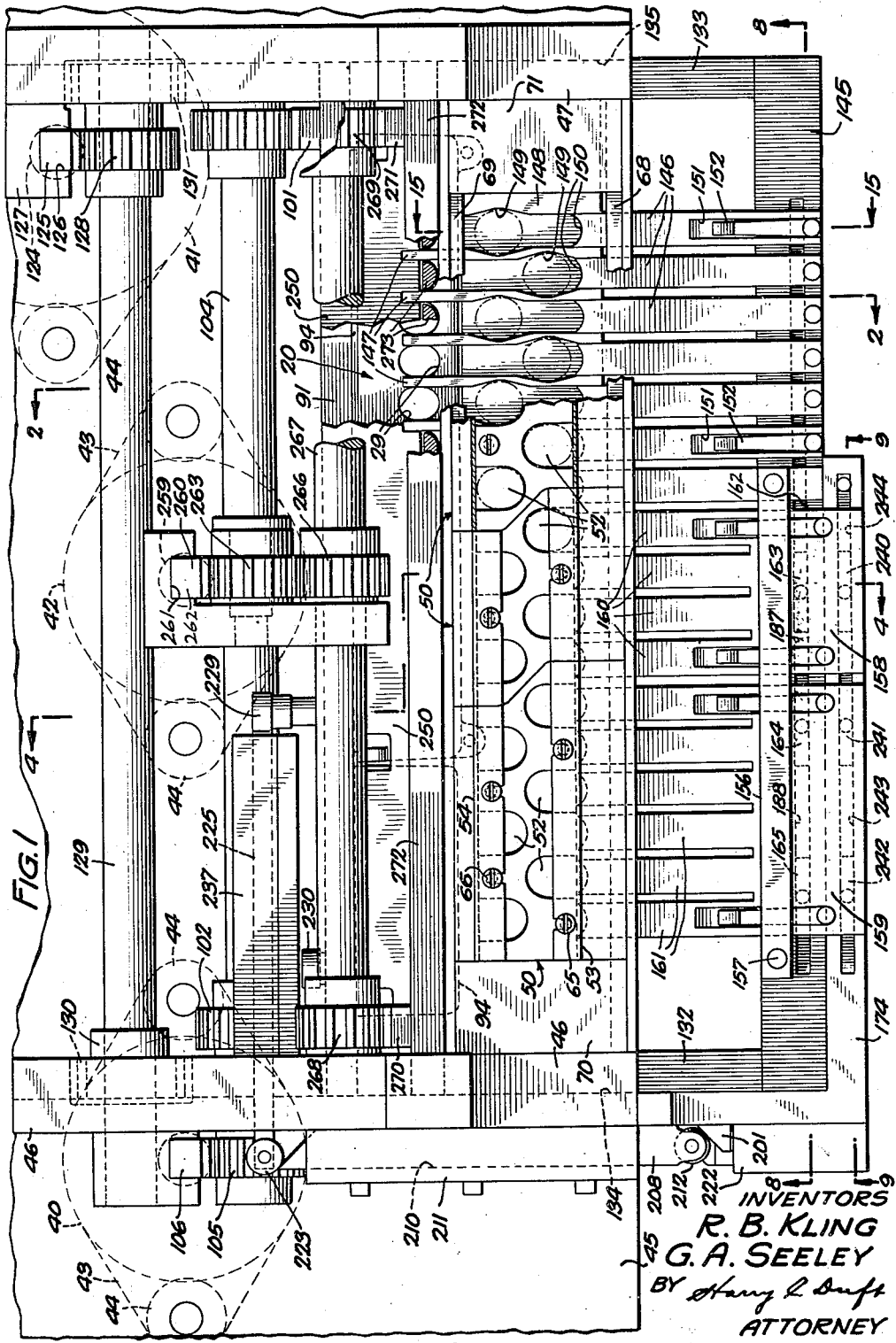
INVENTORS
R. B. KLING
G. A. SEELEY
BY Harry R. Duft
ATTORNEY

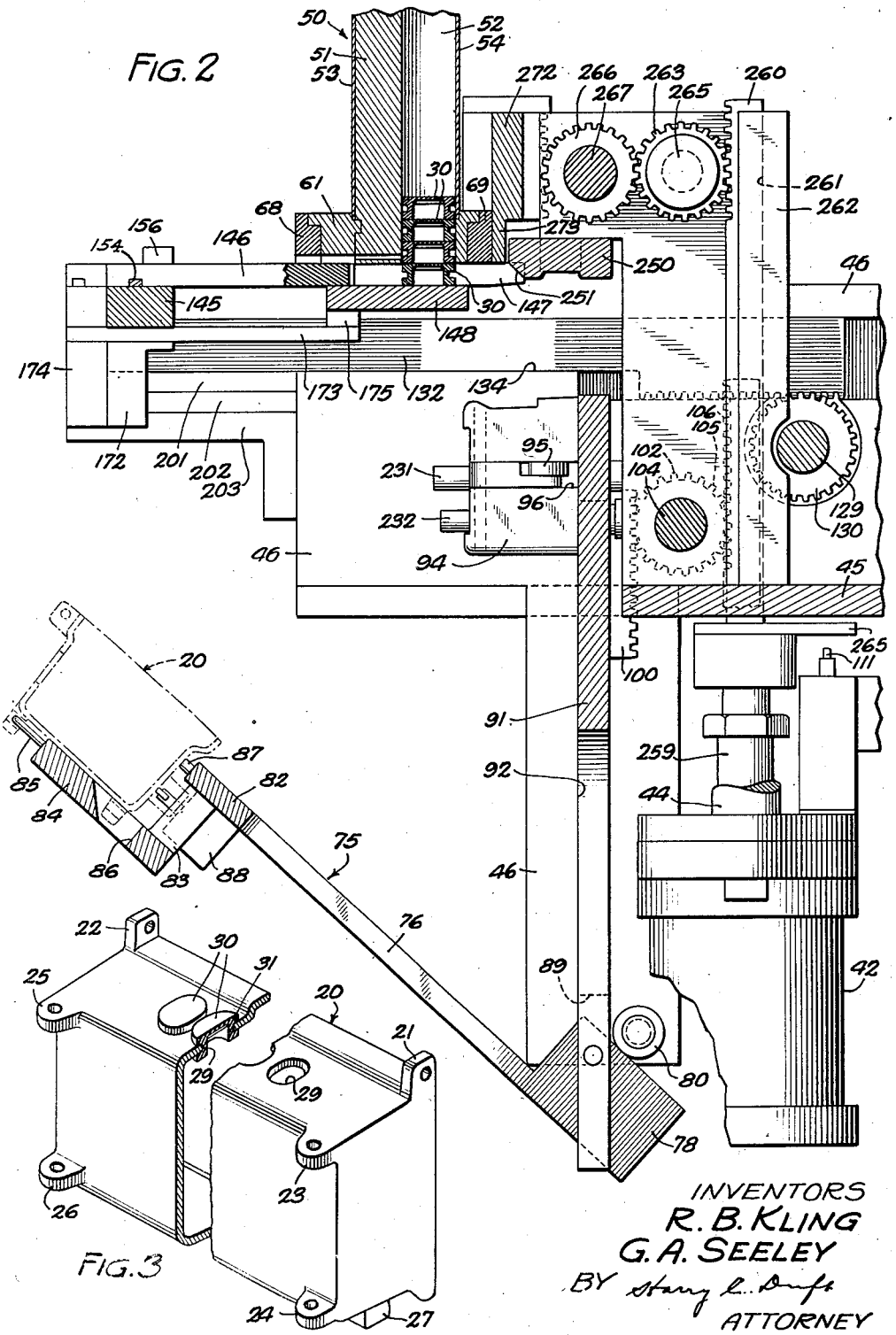

April 24, 1945.  R. B. KLING ET AL  2,374,358
ASSEMBLING APPARATUS
Filed May 6, 1943  7 Sheets-Sheet 3
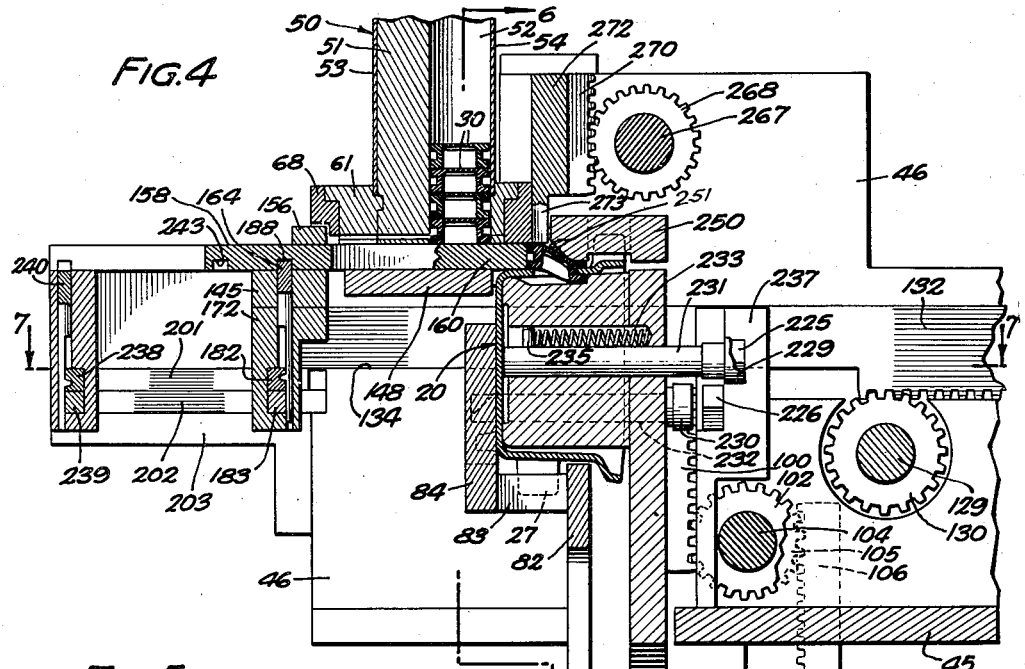
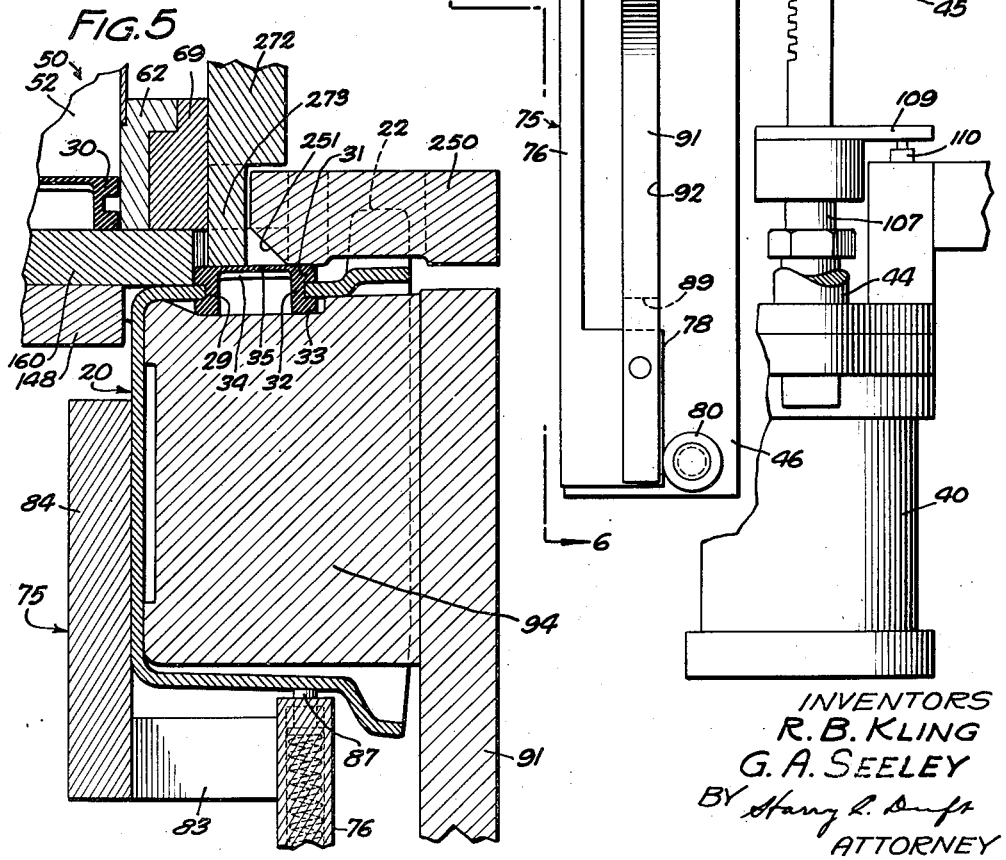
INVENTORS
R. B. KLING
G. A. SEELEY
BY Harry R. Duft
ATTORNEY

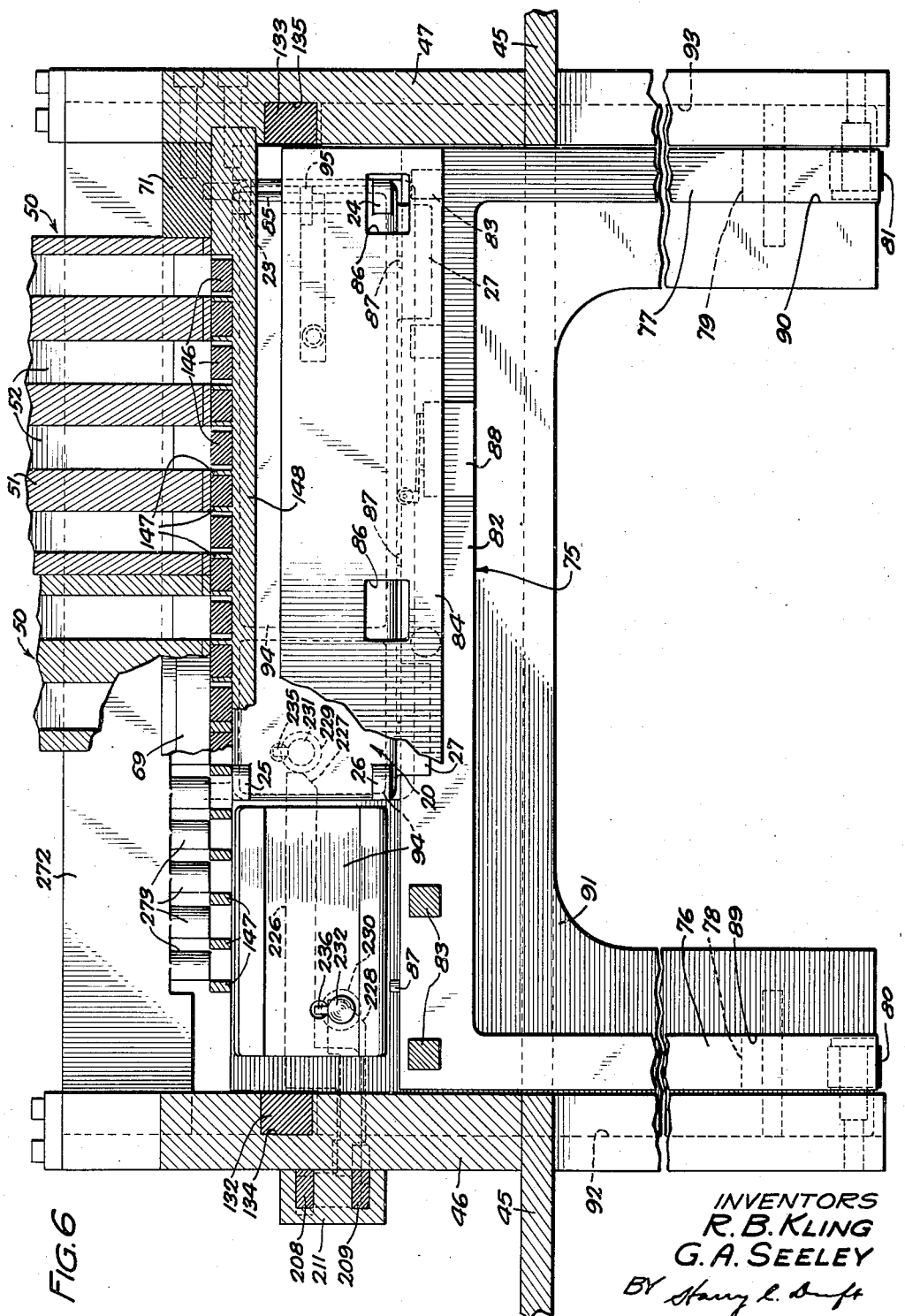

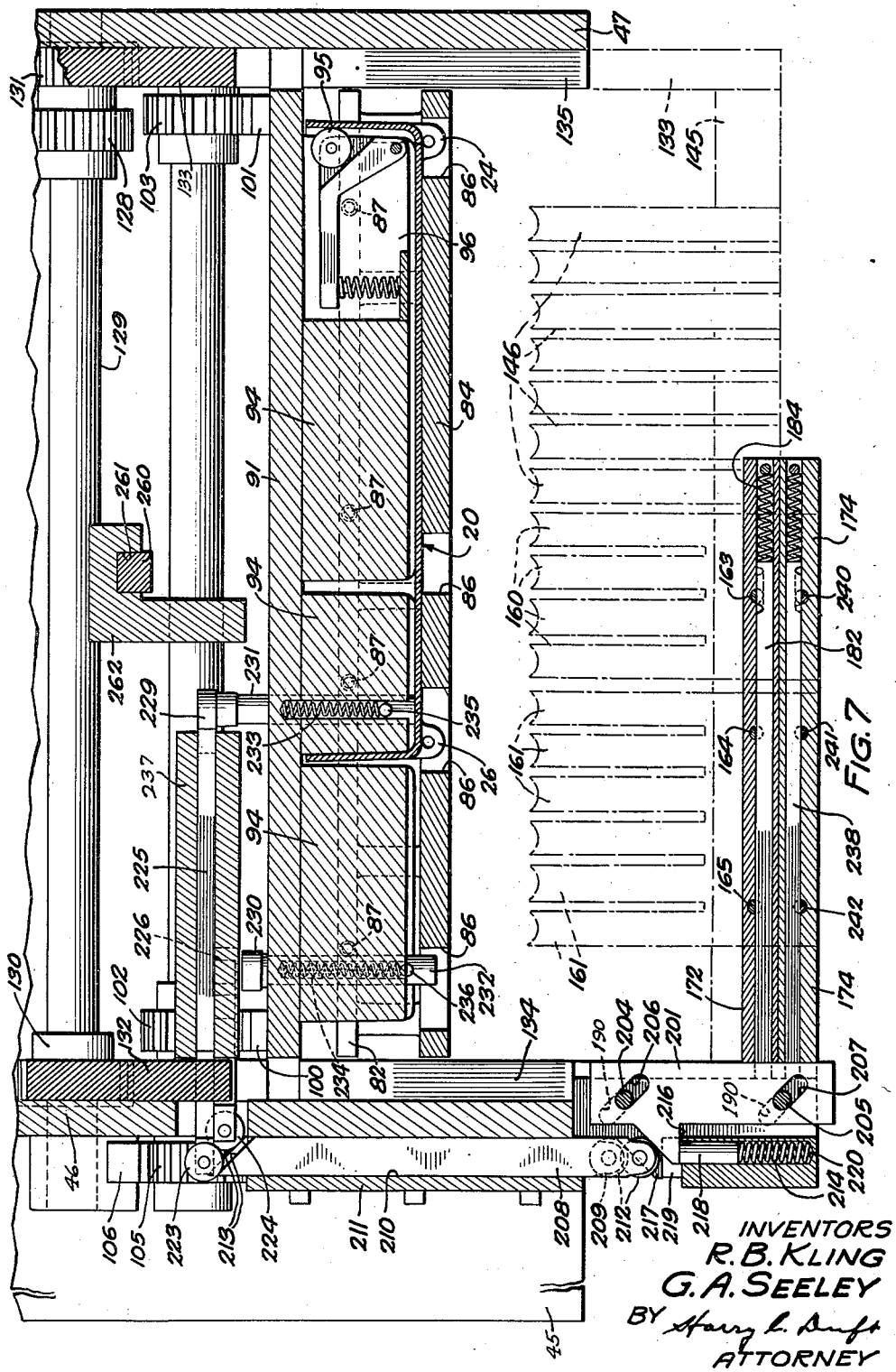

April 24, 1945.　　R. B. KLING ET AL　　2,374,358
ASSEMBLING APPARATUS
Filed May 6, 1943　　7 Sheets-Sheet 6
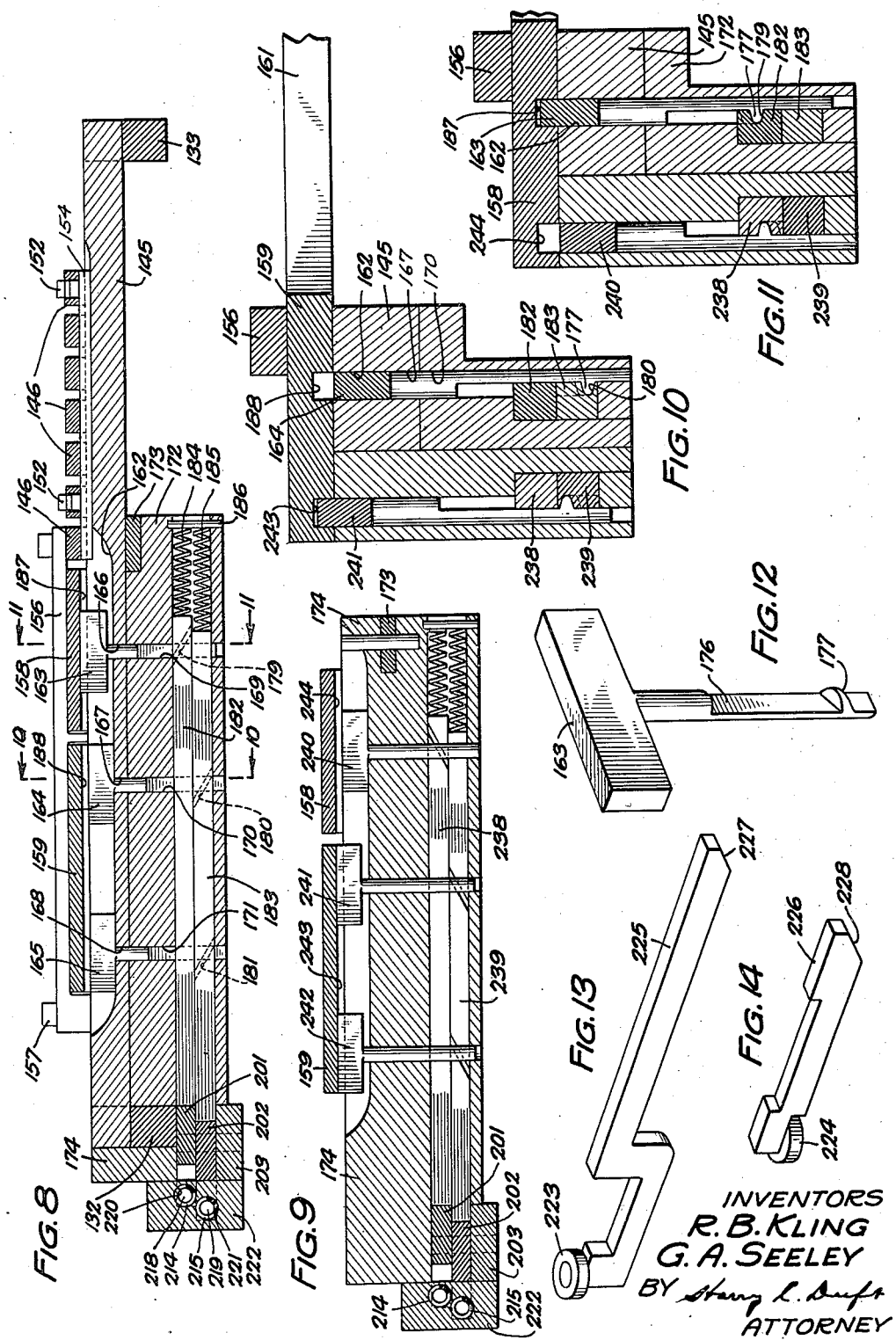

April 24, 1945.　　R. B. KLING ET AL　　2,374,358
ASSEMBLING APPARATUS
Filed May 6, 1943　　7 Sheets-Sheet 7
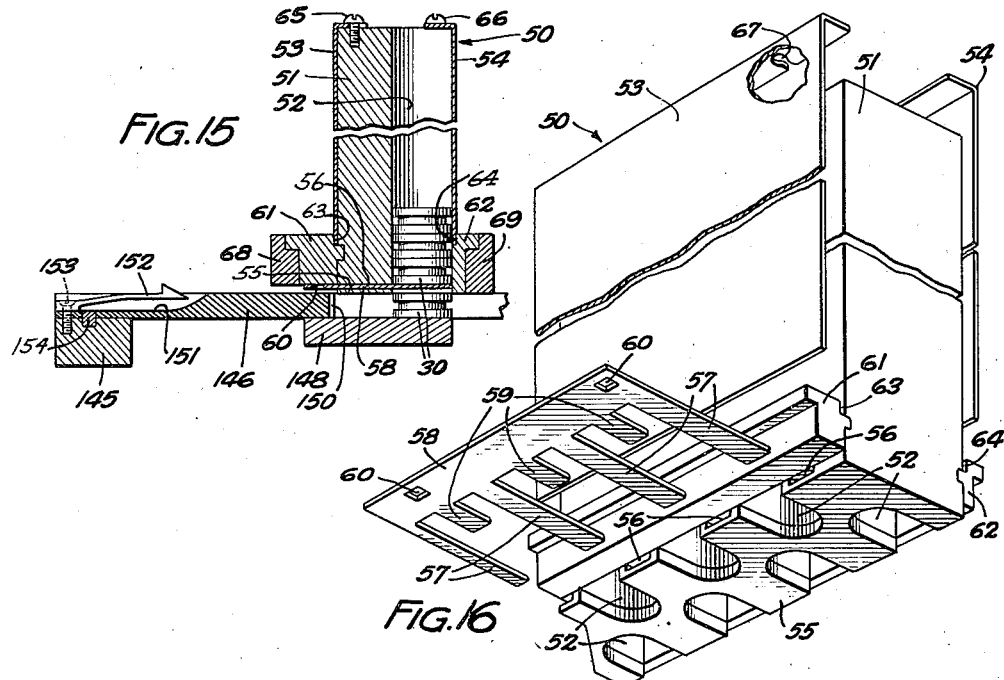
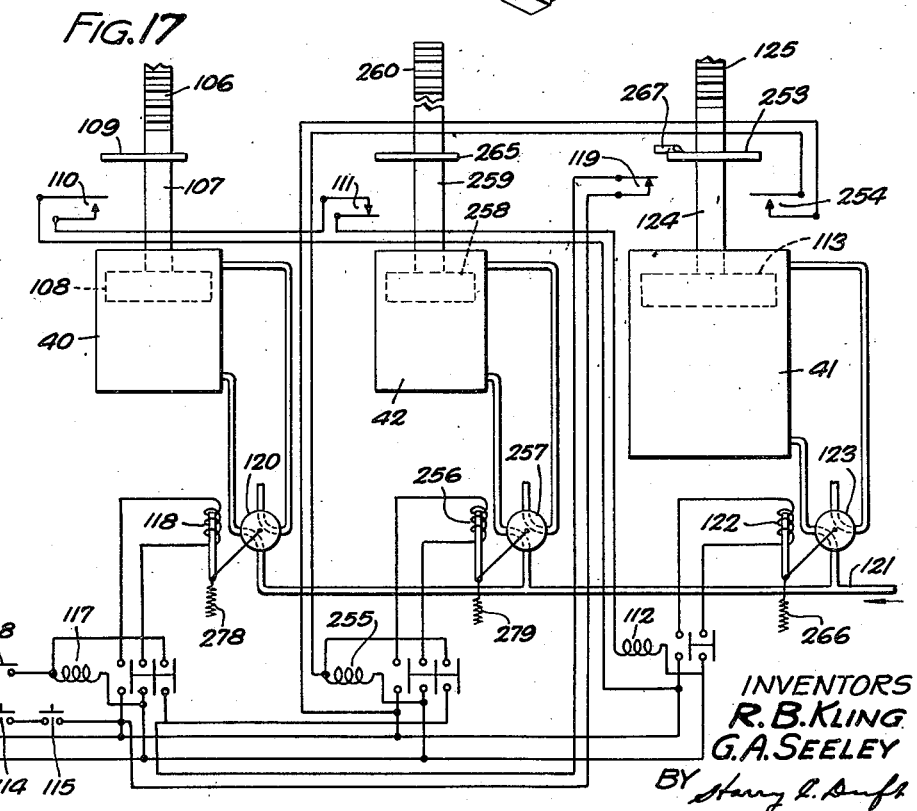
INVENTORS
R. B. KLING
G. A. SEELEY
BY
ATTORNEY Patented Apr. 24, 1945

2,374,358

UNITED STATES PATENT OFFICE 2,374,358

ASSEMBLING APPARATUS

Ralph B. Kling and George A. Seeley, Baltimore, Md., assignors to Western Electric Company, Incorporated, New York, N. Y., a corporation of New York Application May 6, 1943, Serial No. 485,878

11 Claims. (Cl. 29—208)

This invention relates to an assembling apparatus and more particularly to an apparatus for assembling soft rubber grommets in apertures in terminal boxes.

It is an object of the present invention to provide a simple apparatus for expeditiously assembling a plurality of parts.

In accordance with one embodiment of the invention, apparatus is provided wherein in one operation a plurality of soft rubber grommets or bushings, which may vary in number, are inserted in apertures in a terminal box, the size of which controls the number of grommets inserted by the apparatus. The apparatus is hydraulically actuated and the grommets are fed from removable hoppers through guides which deform the grommets and direct their forward ends into the apertures in the terminal box, which has been lifted hydraulically to position to receive the grommets and, thereafter, hydraulically actuated plungers are reciprocated to complete the insertion of the grommets in their respective apertures and to initiate restoration of the apparatus to normal position.

A better understanding of the invention may be had by reference to the following detailed description when considered in conjunction with the accompanying drawings, wherein Fig. 1 is a partial plan view of an apparatus embodying the invention, parts being broken away to show the construction of the guides which guide the grommets to position;

Fig. 2 is a transverse vertical sectional view taken substantially along the line 2—2 of Fig. 1 in the direction of the arrows showing portions of the actuating mechanism for moving terminal boxes to position to receive grommets and the feeding means for the grommets;

Fig. 3 is a view in perspective of a terminal box having apertures for receiving the grommets and showing some of the grommets in place in their apertures, the box being shown broken to conserve space;

Fig. 4 is an irregular transverse vertical sectional view taken substantially along the line 4—4 of Fig. 1 in the direction of the arrows showing a portion of the mechanism for controlling the number of grommets fed by the apparatus;

Fig. 5 is an enlarged fragmentary detailed sectional view through a portion of the mechanism for supporting the terminal box and showing a grommet inserted in an aperture in the terminal box;

Fig. 6 is a fragmentary vertical sectional view taken substantially on the line 6—6 of Fig. 4 in the direction of the arrows showing a portion of the terminal box carrying mechanism and a portion of the control mechanism for determining the number of grommets to be inserted in the terminal box;

Fig. 7 is a fragmentary plan section taken substantially along the line 7—7 of Fig. 4 in the direction of the arrows showing more portions of the control mechanism for determining the number of grommets to be inserted;

Figs. 8 and 9 are fragmentary longitudinal vertical sectional views taken substantially along the line 8—8 and 9—9, respectively, of Fig. 1 in the direction of the arrows, showing still further portions of the control mechanism for determining the number of grommets to be fed;

Figs. 10 and 11 are fragmentary detail sectional views taken substantially along the line 10—10 and 11—11 of Fig. 8 in the direction of the arrows;

Figs. 12, 13 and 14 are detail views in perspective of parts of the control mechanism for the grommet inserting portion of the apparatus.

Fig. 15 is a fragmentary detail sectional view through one of the magazines taken substantially along the line 15—15 of Fig. 1 in the direction of the arrows;

Fig. 16 is a view in perspective of one of the magazines; and

Fig. 17 is a schematic view of the hydraulic and electrical circuits for controlling the operation of the apparatus and regulating the sequence of operation of parts thereof.

Referring to the drawings, wherein like reference characters designate the same parts throughout the several views, particular reference being first had to Fig. 3, wherein there is shown a terminal box 20 having extending lugs 21, 22, 23, 24, 25, 26 and 27, as shown clearly in Fig. 3, and an extending lug 28, not shown in Fig. 3, but shown in Fig. 6. The terminal box 20 has a plurality of entrance apertures 29 along one side of it, which are oval in shape and into which grommets 30—30 are to be inserted. The grommets 30, as most clearly illustrated in Figs. 3 and 5, are also oval in shape and have a flat outer portion 31, a shank portion 32, and a peripherally extending shoulder portion 33. The flat portion 31 has a groove 34 formed in it to provide a very thin walled section, as shown at 35, which may be broken to insert wires through the grommets into the interior of the terminal box after the grommets have been inserted in the apertures 29.

The terminal boxes 20, into which the grommets are to be inserted, may be of any one of three different sizes and in all of the views illustrating the invention, the intermediate size has been shown. The smaller of the terminal boxes 20 are provided with seven grommet receiving aperatures 29, the intermediate size terminal boxes 20 are provided with eleven grommet receiving apertures 29 and the largest size box is provided with seventeen apertures. The apparatus of the present invention is designed to automatically insert grommets into all of the apertures in the boxes under control of the box placed in the apparatus and without any further manual intervention on the part of the operator operating the apparatus.

The various parts of the apparatus are designed to be actuated by three hydraulic cylinders 40, 41 and 42 (Fig. 1). The hydraulic cylinders 40, 41 and 42 are each provided with a head flange 43—43, in which supporting posts 44—44 are fixed and all of the posts 44 are supported on the underside of a shelf or table 45 of irregular configuration, which constitutes one of the fixed portions of the apparatus. The table 45 has suitably attached to it a pair of side frames 46 and 47, which extend upwardly above the table to support some portions of the apparatus and extend downwardly below the table to cooperate with other movable portions of the apparatus.

The grommets 30 inserted in the apertures 29 in the terminal boxes 20 are fed to the terminal boxes from magazines 50, which may be removably mounted on the framework of the apparatus and of which there are provided three cooperating and slightly differently shaped magazines 50. The outer contours of the magazine 50, as most clearly illustrated in Fig. 1, are so shaped that the three magazines will nest in place in the apparatus. One of the magazines 50, as shown in Fig. 16, comprises a main body portion 51, in which there are provided a series of grommet receiving grooves 52, in which the grommets will be held by retainer plates 53 and 54, which are of similar construction. The main body portion 51 has suitably attached to it a base portion 55, in which there are provided a series of slots 56, which cooperate with the bottom of the main body portion 51 to serve as guides for tongues 57 of a retainer comb 58. In addition to the tongues 57, the comb 58 has a series of shorter tongues 59 and while the tongues 57 serve to guide the comb in the slots 56, they also serve, together with the tongues 59, to hold grommets in the grooves 52 at the front and rear of the magazine 50, respectively. The retainer comb 58 is provided with a pair of apertures 60 whereby the comb may be readily removed from the magazine after the magazine has been placed in the apparatus, as will be described more in detail hereinafter.

In addition to the base portion 55, the body portion 51 has attached thereto a pair of guide members 61 and 62 at the rear and front of the magazines, respectively. The guide members 61 and 62 are cut away, as shown at 63 and 64, respectively, to receive the lower ends of the retainer members 53 and 54 when the retainer plates are in their normal position, where the retainer plates may be held by means of machine screws 65 and 66 threaded into the body portion 51 and engaged in apertures 67 in the retainer members 53 and 54, respectively. When the magazines 50 are placed in the apparatus, the guide members 61 and 62 will rest on rails 68 and 69, respectively, which extend across the apparatus being supported by the side frames 46 and 47 and serving to support the three magazines 50 and a pair of spacer blocks 70 and 71 adjacent the side frames 46 and 47, respectively. It should be noted, at this time, as may be seen most clearly in Fig. 1, that the right hand magazine 50 has its left end formed irregularly to cooperate with the right end of the middle magazine 50, whereas the left hand magazine 50 has its right end formed irregularly to cooperate with the middle magazine 50 in such a manner that each magazine unit will support the grommets in it so that the magazines may readily be replaced in position in the apparatus when the supply of grommets in one of the magazines is exhausted. It may be well to note at this time that when the smallest size terminal box 20 is having grommets inserted in it, only the right hand magazine 50 will have grommets removed from it, when the intermediate size terminal box is being supplied with grommets, only the right hand and middle magazines will have grommets removed from them, whereas when the largest size terminal box is having grommets inserted in it, the grommets will be removed from all three magazines 50.

The terminal box 20, into which grommets 30 are to be inserted, may be placed by an operator on a cradle, designated generally by the numeral 75, in the position shown in dot and dash lines (Fig. 2). The cradle 75 is provided with leg portions 76 and 77 (Fig. 6) at the lower ends of which there are formed camming portions 78 and 79, respectively. The camming portions 78 and 79 are adapted to engage with cam rollers 80 and 81, respectively, freely rotatable adjacent the lower ends of the side frames 46 and 47. At their upper ends, the leg portions 76 and 77 are jointed together by a web 82, on which a series of posts 83—83 are mounted for supporting a plate 84, which extends across the entire width of the cradle and is adapted to serve as a back rest for the terminal boxes 20. The plate 84 has extending upwardly from it a locating pin 85, which is adapted to enter the aperture in the right hand lug 23 (Fig. 6) of the terminal box 20, thereby to properly locate the terminal box on the cradle 75. The plate 84 is also cut out, as shown at 86—86, to permit the lugs 24 and 26 to enter the plate so that the terminal box will rest on its back on the plate 84. There are four cut-outs 86 formed in the plate 84 to receive the right hand lug 24 or the left hand lug 26 of the three different sizes of terminal boxes 20. The web 82 of the cradle has a plurality of spring pressed plungers 87 seated in it for normally holding the terminal box 20 up off of the web 82 when the terminal box 20 is placed on the cradle 75. In addition to the plungers 87, the web 82 has fixed to it a highly sensitive switch 88, which will be closed each time a terminal box is placed on the cradle 75 to prepare an operating circuit for the various moving parts of the apparatus.

The camming portions 78 and 79 of the cradle 75 extend into slots 89 and 90 formed in a slidable carrier 91, which is slidable in ways 92 and 93 formed in the side frames 46 and 47, whereby the carrier 91 may be reciprocated vertically. The carrier 91 has a plurality of guide blocks 94 fixed to it, which are adapted to engage the interior of the terminal box 20 of the various sizes and support them relatively rigidly while grommets are inserted in them. The guide blocks 94 will clamp the terminal boxes 20 between the lower surfaces of the guide blocks and the plungers 87 when the cradle 75 is rocked from the position shown in Fig. 2 to the position shown in Fig. 4 and the cradle will be rocked from the position shown in Fig. 2 to the position shown in Fig. 4 by the cam roller 80 engaging the surface of the camming portion 78 as the carrier 91 is moved upwardly. As soon as the sloping edge of the terminal box 20 engages the undersurface of the guide block or guide blocks 94, the plungers 87 will be depressed somewhat to serve to accurately position the terminal boxes 20 on the guide blocks. It will be understood that after the terminal box is moved into engagement with the guide blocks 94, the carrier 91 will move upwardly slightly to tightly clamp the terminal box in position to receive grommets, a spring pressed roller 95 mounted in a slot 96 being provided for urging the terminal box to the right (Figs. 2 and 7).

The carrier 91 has mounted on its rear face, as shown most clearly in Figs. 2, 4 and 7, a pair of racks 100 and 101, which mesh with gears 102 and 103, respectively, mounted upon a shaft 104, which also carries a gear 105 fixed to it. Meshing with the gear 105 is a rack 106 mounted upon the piston rod 107, which carries a piston 108 in the cylinder 40. When the piston 108 moves downwardly (Fig. 17) in the cylinder 40, the piston rod 107 will be drawn downwardly, as will be the rack 106, thereby to rotate the shaft 104 in a clockwise direction (Figs. 2 and 4) and thus cause the carrier 91 to be raised from the position shown in Fig. 2 to the position shown in Fig. 4. As the carrier 91 moves upwardly, the camming portion 78 of the cradle 75, due to its engagement with the cam roller 80, will rock the cradle 75 clockwise to seat the terminal box 20 on the guide block or guide blocks 94. After the terminal box 20 is seated on the guide block or guide blocks 94, further upward movement of the carrier 91 will cause the terminal box to be clamped into position to receive grommets 30.

Mounted on the piston rod 107 (Figs. 4 and 17) is an arm 109 adapted to engage and close a switch 110, which will initiate the operation of other movable parts of the apparatus, as the carrier 91 reaches its upper position. The switch 110 completes a circuit (Fig. 17) through a normally closed switch 111 to energize a relay coil 112 which controls the operation of a piston 113 in the cylinder 41.

The operation of the piston 108, which has been described hereinbefore, may be initiated by the manual closure of a pair of switches 114 and 115, which will connect a 110 volt current source 116 through the switch 88, across the winding of a relay 117. When the relay 117 is energized by the closure of switches 88, 114 and 115, it will connect the 110 volt source 116 to a solenoid 118 and will lock up through the contacts of a normally closed switch 119. When the solenoid 118 is energized, it will shift a valve 120 to position to connect a source of fluid under pressure 121 to the upper end of the cylinder 40, thereby to drive the piston 108 downwardly. As pointed out hereinbefore, the arm 109 will close the switch 110 as the piston 108 reaches its lowermost position and this will cause the energization of the relay coil 112, which will, in turn, complete a circuit from the 110 volt current source 116 to a solenoid 122 for shifting a valve 123 from the position shown in Fig. 17 to position to supply fluid under pressure from the source 121 to the upper end of the cylinder 41, thereby to drive the piston 113 downwardly.

The piston 113 has connected to it a piston rod 124 (Figs. 1 and 17) to the upper end of which there is suitably secured a rack 125. The rack 125, as seen most clearly in Fig. 1, is seated in a slot 126 formed in a bracket 127, which is mounted upon the table or shelf 45. Meshing with the rack 125 is a gear 128 fixed to a shaft 129, which also carries a pair of gears 130 and 131 in mesh with rack bars 132 and 133, respectively. The rack bars 132 and 133 are slidable horizontally in ways 134 and 135, respectively, formed in the side frames 46 and 47.

The forward ends of the rack bars 132 and 133 are interconnected by a plate 145 having attached to it seven feed fingers 146, which are adapted to feed grommets from the right hand magazine 50. The feed fingers extend into position between the guide rails 147 formed integrally with a cross plate 148, which is suitably mounted on the side frames 46 and 47 and extend across the apparatus beneath the rails 68 and 69. The cross plate 148 is milled out to form the guide rails 147 and it should be noted that the space between adjacent rails 147 narrows down toward the end of the rails 147 and that directly beneath the grooves 52 in the magazines 50 pockets 149 are formed by the guide rails 147, being cut away slightly so that grommets may drop from the grooves 52 into the trackway formed by the rails 147 and that the grommets which drop down onto the cross plate 148 will be pressed as they are pushed toward the rear of the apparatus by the feed fingers 146, thus to facilitate their entry into the apertures 29 in the terminal box 20. It should also be noted that the ends of the feed fingers 146 are concave, as shown at 150, to engage a large surface of the grommets as the feed fingers feed grommets toward the aperture 29 in the terminal boxes. Two of the feed fingers 146 have slots 151 milled in them (Figs. 1 and 15) for receiving resilient catches 152, which are attached to the feed fingers 146 and plate 145 by means of flat head machine screws 153. The first time the feed fingers 146 are moved to the right (Fig. 15), they will carry the grommet 30, which had been dropped into position on the cross plate 148, from a previous magazine, and will feed that grommet toward a terminal box positioned to receive grommets. As the feed fingers 146 reach their farthest position to the right (Fig. 15), the catches 152 will engage in the apertures 60 in the retainer comb 58 and when the feed fingers 146 are retracted to their normal position, as shown in Fig. 15 and Fig. 1, the retainer cone 58 will be pulled out from under the magazine 50, then positioned on the rails 68 and 69, to permit grommets 30 to drop down out of the magazine onto the plate 148 into the pocket 149.

Those feed fingers 146 which do not have catches 152 mounted in them are held on the plate 145 by means of a key 154 common to all of the fingers 146 and by the machine screws 155 individual to the feed fingers 146.

The lefthand one of the feed fingers 146, as viewed in Fig. 1, has one end of a bridging plate 156 bolted onto it and the opposite end of this bridging plate is attached directly to the plate 145 by means of a machine screw 157 whereby the bridging plate 156 will always move with the plate 145. Positioned between the bridging plate and the plate 145 are a pair of feed plates 158 and 159 having feed fingers 160 and 161 formed integrally therewith. The feed fingers 160 and 161 correspond to the feed fingers 146 and serve to feed grommets from the middle and lefthand magazines 50 (Fig. 1) in the same manner that the feed fingers 146 feed grommets from the right hand magazine 50. The feed fingers 160 and 161, however, are inoperative unless either medium size or the largest size terminal boxes are being operated upon in the apparatus and when the smallest size terminal boxes are being operated upon, the plates 158 and 159 will be locked in the position shown in Fig. 1 when the plate 145 moves toward the rear of the apparatus to actuate the fingers 146.

The plate 145 has a slot 162 milled in it (Figs. 1, 8, 10 and 11) for receiving the heads of three key members 163, 164 and 165. The shanks of the three members 163, 164 and 165 extend down through apertures 166, 167 and 168, respectively, formed at the base of the slot 162 and into apertures 169, 170 and 171 formed in a block 172 suitably attached to the underside of the plate 145. The right end (Fig. 8) of the block 172 is cut out to receive a guide plate 173, which extends from the front side of an L-shaped member 174 at the front of the apparatus to a position partly under the cross plate 148, from which the guide plate 173 is spaced by a spacer 175. Thus, the guide plate 173 serves to support the plate 145 in its travel, the L-shaped member 174 being fixed to the side frame 46. The banks of the key members 163, 164 and 165 are all of substantially the same construction and the key member 163 is shown in detail in Fig. 12, wherein its shank is cut away, as shown at 176, to provide a flattened portion from which a cam lug 177 extends. Each of the key members 163, 164 and 165 have similar cam lugs on them and these cam lugs extend into slots 179, 180 and 181. The slot 179 is formed in a camming plunger 182 and the slots 180 and 181 are formed in a camming plunger 183, both of the camming plungers being normally urged to the left (Fig. 8) by compression springs 184 and 185, respectively, which abut the ends of the plungers and a pin 186.

From the foregoing, it is believed to be apparent that when the camming plunger 182 is moved to the right against the action of the spring 184, as will be described hereinafter, the key member 163 will be moved upwardly to the position shown in Fig. 8 and when the plunger 183 is moved to the right (Fig. 8), the key members 164 and 165 will be moved from the position shown in Fig. 8 to a position in alignment with the key member 163. The feed plates 158 and 159 are provided with key slots 187 and 188 and when any one of the key members 163, 164 or 165 are moved to their upper positions, the key members will lock the feed plate with which it is associated to the plate 145 for movement by the plate 145. Similarly, when the key members 163, 164 and 165 are in their downward position, as illustrated by the position of key members 164 and 165 in Fig. 8, the plates associated with the key member that is down will not be moved by the plate 145.

The camming plungers 182 and 183 have cooperating with them slidable actuator members 201 and 202, respectively, which are positioned in superposed relation between the L-shaped member 174 and a plate 203 attached to the L-shaped member 174. A pair of pins 204 and 205 (Fig. 7) are fixed in the plate 203 and extend into slots 206 and 207, respectively, in the member 201. Similar slots 190—190 are formed in the members 202 and when operated, the actuator members will be moved toward the front of the machine and to the right (Figs. 7 and 8) by either one of a pair of slidable camming members 208 and 209. The camming members 208 and 209 are mounted in superposed relation in a slot 210 formed in a guide member 211. The camming members 208 and 209 are of exactly the same construction and each of them carries a roller 212 at its forward end and has a cam face 213 at its rear end. The camming members 208 and 209 are urged toward the rear of the apparatus by compression springs 214 and 215, which engage plungers 218 and 219, which, in turn, bear against shoulders 216 and 217, respectively, on the actuator members 201 and 202. The springs 214 and 215 are seated in pockets 220 and 221 in a block 222 mounted on the left hand surface of the L-shaped member 174. The cam faces 213 on the camming members 208 and 209 are in engagement with a pair of actuator rollers 223 and 224 (Figs. 7, 13 and 14), which are, in turn, mounted upon the left end (Fig. 7) of a pair of irregularly shaped push rods 225 and 226 having cam faces 227 and 228. The cam faces 227 and 228 of the push rods 225 and 226 are so positioned that they will be engaged by cam rollers 229 and 230 when the cam rollers are shifted from their normal position to position in vertical alignment with the push rods 225 and 226 by a medium size terminal box 20 or a large size terminal box 30, being fed to the apparatus. The cam rollers 229 and 230 are mounted on the ends of plungers 231 and 232, respectively, which extend through the middle and lefthand guide blocks 94 and are urged toward the front of the machine by compression springs 233 and 234, respectively (Figs. 4 and 7), which are seated in the guide blocks 94 and engage pins 235 and 236 fixed in the plungers 231 and 232, respectively. The push rods 225 and 226 are slidably mounted in a bracket 237 extending upwardly from the table 45 and when they are pushed to the left (Fig. 7) due to the engagement of the plungers 231 and 232 by the largest size terminal box 20, the cam rollers 229 and 230 will be moved into vertical alignment with the push rods 225 and 226, whereby, when the terminal box 20 is carried upwardly to the position shown in Figs. 4 and 5, the cam rollers 229 and 230 will engage the push rods 225 and 226 to push them to the left (Fig. 7). When the rods 225 and 226 are pushed to the left, they will push the camming members 208 and 209 toward the front of the apparatus and shift both of the actuator members 201 and 202 to the right (Fig. 7), thus to push the camming plungers 182 and 183 to the right (Fig. 8) and push similar camming plungers 238 and 239 to the right (Fig. 9). The camming plungers 238 and 239 are of a construction similar to the camming plungers 182 and 183 and have similar slots formed in them for engaging cam lugs 177 formed on key members 240, 241 and 242. It will be noted that the slots in the camming plungers 238 and 239 are oppositely disposed with respect to those formed in the camming plungers 182 and 183, whereby, when the plungers 182 and 183 retract their key members 164 and 165 from engagement with key slot 188 in the feed plate 159, the key members 241 and 242 will be pushed out into a key slot 243 in the plate 159 and, similarly, when the key member 163 is pushed into the key slot 187 in the feed plate 158, the key member 240 will be retracted from a key slot 244 in the feed plate 158. While the block 172 in which the key members 163, 164 and 165 are slidable vertically is fixed to the plate 145, it will be understood that the key members 240, 241 and 242 are slidable in the L-shaped member 174, and thus when the key members 163 or 164 or 165 are moved upwardly to engage the key slot 187 or 188, the key member 240 or key members 241 or 242 must be retracted from the key slots 244 and 243. Accordingly, the actuator member 201 controls the operation of the plungers 182 and 238, whereas the actuator member 202 controls the operation of the cam plungers 183 and 239.

After a terminal box 20 has been carried to the position shown in Figs. 4 and 5, and the plungers 231 and 232 have been set in place to shift the key members 163, 164, 165, 240, 241 and 242, if necessary, depending upon the size of the terminal box 20, the plate 145 will be drawn toward the rear of the apparatus to feed the proper number of grommets toward the terminal box and into the apertures 29 therein. The forward ends of all of the feed fingers 146, 160 and 161, in moving under the magazines 50, will carry the grommets which have been deposited in the pockets 149 toward the terminal box apertures and as the grommets are fed toward the rear of the machine, they will be deformed to a substantially oval outline by the guide rails 147. As the grommets approach the apertures 29 in the terminal box held in the position shown in Figs. 4 and 5, the advancing tip of the grommets will engage a guide plate 250, which extends across the apparatus being fixed to the side frames 46 and 47. This guide plate 250 is formed with a guide surface 251, which the advancing end of the grommet will engage, whereby the grommet will be deflected downwardly, as shown most clearly in Fig. 4, to cause the advancing edge of it to be inserted in the aperture with the flat portion 31 of the grommet above the outer surface of the terminal box and the shoulder 33 inside the terminal box.

As soon as the piston 113 has almost completed its travel and the grommet 30 is in the position shown in Fig. 4, a contact operating arm 253 on the piston rod 124 (Fig. 17) will close a switch 254 to complete a circuit from the 110 volt source 116 to energize a relay 255, which will lock up over its locking contacts and complete a circuit to energize a solenoid 256. Energization of the solenoid 256 will shift a valve 257 from the position shown in Fig. 17 to operative position, where it will supply fluid under pressure from the source 121 to the upper end of the cylinder 42. The cylinder 42 has a piston 258 in it which will be driven downwardly to draw a piston rod 259 downwardly. The rack 260 attached to the piston rod 259 rides in a trackway 261 formed in the bracket 262, which is, in turn, mounted upon the table 45. Meshing with the rack 260 is an idler 263 mounted upon a stud shaft 265 fixed in the bracket 262. The idler 263 meshes with a drive gear 266 fixed onto a shaft 267, which also carries a pair of gears 268 and 269 (Fig. 1) in mesh with racks 270 and 271. The racks 270 and 271 are fixed to a cross plate 272, which is slidable in the side frames 46 and 47 and which carries a plurality of inserting fingers 273, one in alignment with each possible grommet receiving aperture on the largest size terminal box 20. Thus, when fluid under pressure is admitted to the upper end of the receiving member 42, the cross plate 272 will be moved downwardly to the position shown in Fig. 5 to push the grommet from the position shown in Fig. 4 to the position shown in Fig. 5, thus completing the insertion of all the grommets at one time. As the piston rod 259 reaches its lowermost position, a contact actuating arm 265 mounted upon it will open the normally closed switch 111, thus breaking the locking circuit for the relay 112 which will, thereupon, release as the relay 112 releases, solenoid 122, which will have its path to the current source broken, and a spring 266 will rock the valve 123 to the position shown in Fig. 23 and thus to permit the fluid to escape from the upper end of the cylinder 41 and to permit fluid under pressure to the lower end of the cylinder 41. The contact operating arm 253 carries a hinged member 267, which, when the piston rod 124 moves downwardly, will rock on the upper contact of switch 119, but when the piston 124 moves upwardly, the hinged member 267 will momentarily open the switch 119, thereby breaking the locking circuit to relays 117 and 255, releasing these relays which will, in turn, release their associated solenoids 118 and 256 and permit the springs 278 and 279 to restore the valves 120 and 257 to the position shown in Fig. 17. With the valves 120 and 257 in the positions shown in Fig. 17, fluid under pressure will be directed to the bottom of the cylinders 40 and 42 and the pistons 108 and 258 will return to the positions shown, thus restoring the apparatus to its normal position.

A better understanding of the apparatus may be had by reference to the following brief description of the operation thereof. In order to initiate operation of the apparatus, the two manually operable switches 114 and 115 must be closed and a terminal box of one of the three sizes placed in position on the cradle 75. When the terminal box 20 is placed on the cradle 75, it will cause the switch 88 to be closed and immediately the relay 117 will be energized through the contacts of the switches 114, 115 and 88, thereby to complete a circuit to operate solenoid 118. When solenoid 118 is energized, the valve 120 will be moved to the opposite position from that shown in Fig. 17 and fluid under pressure will be directed from the source 121 through the valve 120 to the upper end of the cylinder 40, thereby to move the piston 108 downwardly. As the piston 108 moves downwardly, the rack 106 will rotate the shaft 104 (Figs. 2 and 4) in a clockwise direction, thereby to move a slidable carrier 91 upwardly. As the carrier 91 moves upwardly, the cradle 75 will be locked to position to carry the terminal box 20 into engagement with the blocks 94. If the smallest size terminal box has been placed on the cradle 75, neither the plunger 231 nor the plunger 232 will be moved toward the rear of the machine. However, if the intermediate size terminal box 20 has been placed on the cradle 75, the plunger 231 will be depressed to move its cam roller 229 beneath the push rod 225. As the piston 108 continues to move downwardly, the slidable carrier 91 will move upwardly to clamp the terminal box between the upper surface of the block 94 and the lower surface of the guide rails 147. In the latter part of its travel, the slidable carrier 91 will cause the cam roller 229 on plunger 231 to move the push rod 225 to the left (Fig. 7). When the push rod 225 is moved from the left (Fig. 7), the camming member 208 will be moved toward the front of the machine and, accordingly, will shift the actuator member 201 to the right (Fig. 7), thus moving the camming plungers 182 and 238 to the right (Figs. 7, 8 and 9). As the camming plunger 238 moves to the right, it will draw the key 240 out of the notch 244 in the feed plate 158 and as the camming plunger 182 moves to the right, it will push the key member 163 into the slot 187 in the feed plate 158. Thus the feed plate 158 will be tied to the plate 145 for movement with it. If, on the other hand, the largest size terminal box 20 is placed on the cradle 75, both the plungers 231 and 232 will be depressed and, in addition to locking the feed plate 158 to the plate 145, the plungers 239 and 183 will be shifted to the right (Figs. 8 and 9) to move the keys 164 and 165 into the slot 188 and the feed plate 159 and to unlock the key members 241 and 242 from the slot 243 in the feed plate 159 by moving the last two mentioned key members downwardly.

As soon as the piston 108 reaches its lowermost position, the arm 109 on the piston rod 107 will close switch 110 to supply current from the source 116 to energize the relay 112. When relay 112 is energized, it will supply energizing current to the solenoid 122, which will shift its valve 123 to connect the source of fluid under pressure 121 to the upper end of the cylinder 41. When the fluid under pressure is admitted to the upper end of the cylinder 41, piston 113 will be driven downwardly, thereby to actuate the rack bars 132 and 133 and move the plate 145 toward the rear of the apparatus. As the plate 145 moves toward the rear of the apparatus, the feed fingers 146 and the feed fingers 160 and 161 will be moved toward the rear of the apparatus to feed grommets from the pockets 149 toward the rear of the machine. It will be understood that the feed fingers 160 and 161 will be operative only if both of the plungers 231 and 232 have been actuated and that if only the plunger 231 has been moved from its normal position, only the feed fingers 160 will be moved toward the rear of the apparatus. As the feed fingers which have been selected for operation move toward the rear of the apparatus, they will force the grommets from the pockets 149 between the rails 147 and will deform the grommets in two planes. In the horizontal plane, the grommets will be deformed to facilitate their entrance into the apertures 29 and, in addition, the advancing ends of the grommets will be directed downwardly, as shown in Fig. 4 and into the aperture 29. As the piston 113 reaches the end of its travel, it will close the switch 254 to supply energizing current to the relay 255, which will close the circuit to the solenoid 256. As soon as the solenoid 256 is energized, it will shift the valve 257 to supply fluid under pressure to the upper end of the cylinder 42. Thus, the piston 258 will be driven downwardly to drive the cross plate 272 downwardly and cause the inserting fingers 273 to push the rest of the grommet the rest of the way into the aperture 29. As the piston 258 reaches the end of its travel, it will open the normally closed switch 111 to break the holding circuit for relay 112 and as relay 112 is de-energized, solenoid 122 will be de-energized to reverse the valve 123 and cause the piston 113 to be driven upwardly. In travelling upwardly, the piston 113 will, through the hinged member 267, momentarily open switch 119, breaking the locking circuit for relays 255 and 117 and these relays will, upon de-energization, break the circuits to the solenoids 118 and 256 to cause the reversal of valves 120 and 257, which will then supply fluid under pressure to the lower ends of the cylinders 40 and 42 for restoring the apparatus to its normal position.

What is claimed is:

1. A grommet inserting apparatus comprising an electrically controlled hydraulic circuit including means operable by an article for preparing said circuit for operation, manually controlled means for initiating operation of said circuit, a piston actuated means operable under control of said circuit for moving an article to position to receive grommets, a second piston actuated means operable under control of the piston actuating the first-mentioned piston actuated means for partially inserting grommets in the article, and a third piston actuated means for completing the insertion of the grommets.

2. A grommet inserting apparatus comprising an electrically controlled hydraulic circuit including means operable by an article for preparing said circuit for operation, manually controlled means for initiating operation of said circuit, a piston actuated means operable under control of said circuit for moving an article to position to receive grommets, a second piston actuated means operable under control of the piston actuating the first-mentioned piston actuated means for partially inserting grommets in the article, a third piston actuated means for completing the insertion of the grommets, and means operable under control of the third piston actuated means for restoring the hydraulic circuit to normal.

3. A grommet inserting apparatus comprising an electrically controlled hydraulic circuit including means operable by an article for preparing said circuit for operation, manually controlled means for initiating operation of said circuit, a piston actuated means operable under control of said circuit for moving an article to position to receive grommets, a second piston actuated means operable under control of the piston actuating the first-mentioned piston actuated means for partially inserting grommets in the article, a third piston actuated means for completing the insertion of the grommets, and means operable under control of the third piston actuated means for initiating the return of the pistons to normal.

4. A grommet inserting apparatus comprising an electrically controlled hydraulic circuit including means operable by an article for preparing said circuit for operation, manually controlled means for initiating operation of said circuit, a piston actuated means operable under control of said circuit for moving an article to position to receive grommets, a second piston actuated means operable under control of the piston actuating the first-mentioned piston actuated means for partially inserting grommets in the article, a third piston actuated means for completing the insertion of the grommets, and means under control of the article for determining the number of grommets inserted in the article.

5. A grommet inserting apparatus comprising an electrically controlled hydraulic circuit including means operable by an article for preparing said circuit for operation, manually controlled means for initiating operation of said circuit, a piston actuated means operable under control of said circuit for moving an article to position to receive grommets, a second piston actuated means operable under control of the piston actuating the first-mentioned piston actuated means for partially inserting grommets in the article, a third piston actuated means for completing the insertion of the grommets, and means shiftable from normal to operative position by an article for determining the number of grommets inserted by the article.

6. A grommet inserting apparatus comprising an electrically controlled hydraulic circuit including means operable by an article for preparing said circuit for operation, manually controlled means for initiating operation of said circuit, a piston actuated means operable under control of said circuit for moving an article to position to receive grommets, a second piston actuated means operable under control of the piston actuating the first-mentioned piston actuated means for partially inserting grommets in the article, a third piston actuated means for completing the insertion of the grommets, and means operable by an article for controlling the operation of the second piston actuated means to determine the number of grommets inserted.

7. In an apparatus for inserting grommets in articles, a support for positioning an article to receive grommets, means cooperating with the support for inserting grommets in the article, a plurality of magazines for supplying grommets to the inserting means, and means for controlling the operation of the inserting means to transfer grommets from said magazines to the articles comprising plungers selectively shiftable by various sizes of articles for rendering parts of the inserting means operative.

8. In an apparatus for inserting grommets in articles, means for positioning an article to receive grommets, means for deforming grommets to facilitate their entry into apertures in the article, means for completing the insertion of the grommets which have been thus deformed, and means under control of the means for positioning the article for initiating the operation of the grommet deforming means.

9. In an apparatus for inserting grommets in articles, means for positioning an article to receive grommets, means for inserting grommets into the articles on said positioning means comprising a pair of grommet engaging members operable in automatic succession, and means controlled by said means for positioning the article for initiating the operation of one of said grommet engaging members.

10. In a grommet inserting apparatus, guide means having converging side walls for compressing a grommet in one direction to facilitate its insertion in an aperture, a second guide means for directing the compressed grommet in a direction at right angles to the direction in which it is compressed to bend a compressed portion of it into the aperture, means for pushing the grommet partially through the guide means and partially into the aperture, and means movable at right angles to the pushing means for pushing the grommet into the aperture.

11. In a grommet inserting apparatus, means for supporting an article having an aperture for receiving a grommet, means for compressing opposed sides of a grommet to contract the transverse dimension of the grommet thereby leaving the remaining opposed sides uncontracted, means for inserting one of the uncontracted sides into an aperture in an article supported by the supporting means, and means for inserting the remainder of the grommet into the aperture.

RALPH B. KLING.
GEORGE A. SEELEY.